March 9, 1937.  E. C. EBERTS  2,073,339
PROCESSING BEANS AND OTHER COMESTIBLES
Filed Jan. 4, 1936
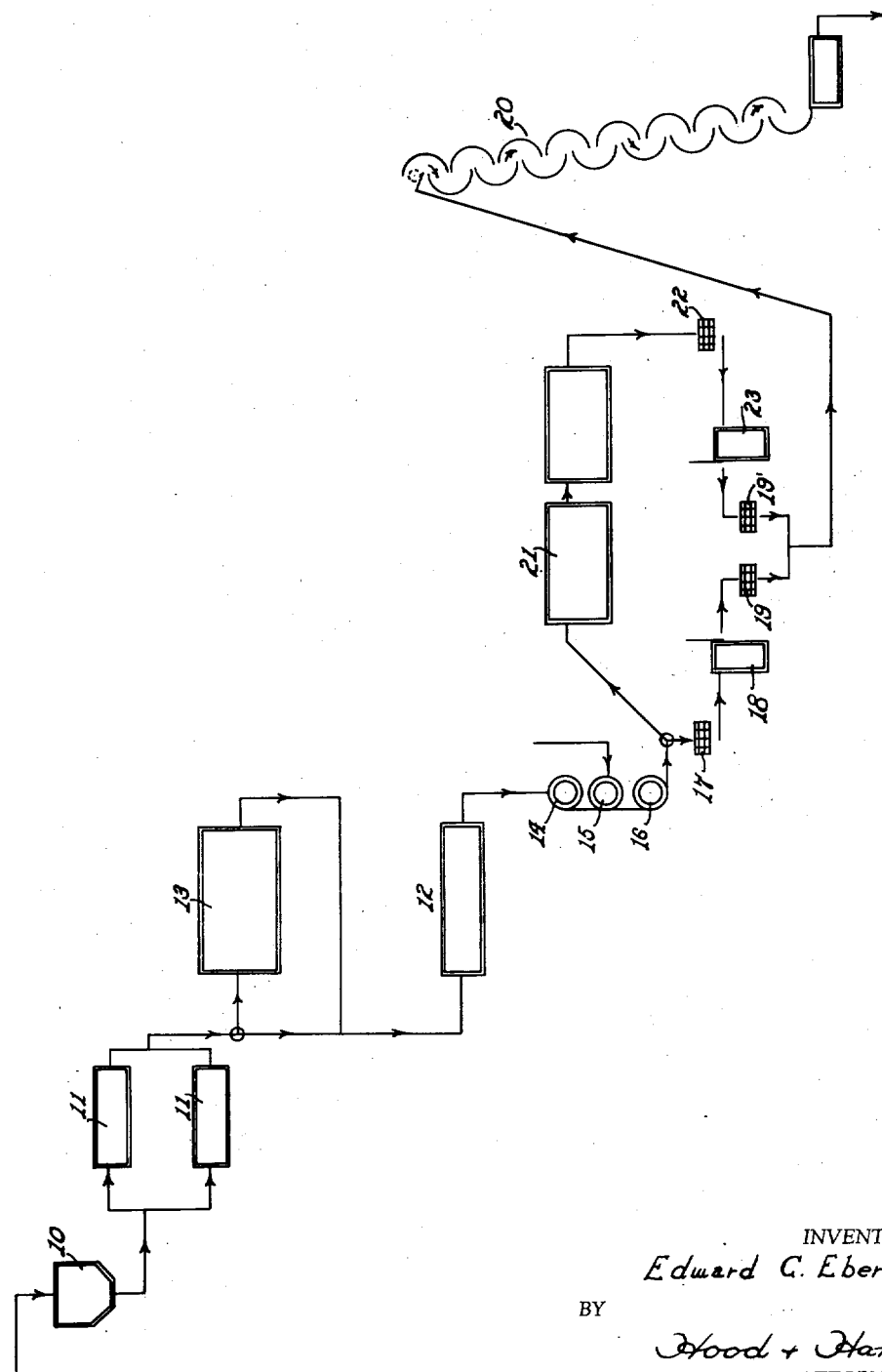
INVENTOR.
Edward C. Eberts,
BY
Hood + Hahn.
ATTORNEYS.

Patented Mar. 9, 1937

2,073,339

UNITED STATES PATENT OFFICE 2,073,339

PROCESSING BEANS AND OTHER COMESTIBLES

Edward C. Eberts, Indianapolis, Ind.

Application January 4, 1936, Serial No. 57,488

7 Claims. (Cl. 99—186)

My invention relates primarily to an improved method of treating food seeds, such for instance as dry beans, by which they may be more cheaply transformed into an acceptable comestible of improved quality, taste and nutritive value.

Since early colonial times dry beans have been transformed into so-called "baked" beans which in the early days were generally prepared at home. The usual method of treatment involved a preliminary water soaking over-night; a subsequent "blanching" or "parboiling"; draining of the parboiling liquor; a deposit of the partially cooked beans in a pot with syrup, condiments and salt pork, and a final prolonged heat treatment at comparatively low oven temperature.

More recently commercial packages—cans—of "beans and pork" or "pork and beans" have become staple articles of commerce and in the production of such packages the producers have sought to duplicate, as nearly as practicable, the above-described "home" procedure, and heretofore, so far as I am aware, it has always been considered necessary to subject the beans to a preliminary soaking and parboiling before they are placed in the cans and subjected to further and final heat treatment.

Some species of beans were found more acceptable than others for the above-described purposes and there were certain species of beans which were found to be practicably useless for the purpose.

For instance, beans of an apparently proper species but grown in California were found to be practically useless for the desired purpose because, for some unknown reason, they were practically impervious by water and, unless the external skin were pierced or ruptured, they would not absorb a sufficient amount of water within a reasonable length of time and, when subjected to prolonged soaking would become undesirably mushy during the subsequent necessary high-heat treatment.

I have discovered that material savings in cost of production, and material increases in ultimate yield per weight of dry beans; material improvements in flavor and nutrition value, and preservation of a greater proportion of whole beans, may be attained in the following manner, irrespective of the geographical origin of the dry bean.

One of the major difficulties, in the production of cooked beans which may be properly designated as "baked" beans acceptable to discriminating consumers, is not only the avoidance, to a high percentage, of breakage of individual beans but an establishment of individualization of unbroken beans in a fairly fluid sauce so that, when processing is completed, and the can opened after shipment and an extended storage period, the customer will find the major content to be individual thoroughly "baked" beans in a fluid sauce, unaccompanied by any substantial mush of broken bean.

The accompanying drawing illustrates a flow sheet of alternate forms of equipment for practicing my improved method.

The raw beans are first passed through the usual dry cleaner 10 from which they flow over one or more riffle tables 11 in a light water stream which serves to loosen and separate adhered dirt, but which is insufficient to permit any substantial water absorption. From the riffle tables the beans pass to a picking belt 12 of usual form, either directly or through a sponge cleaner 13. On the picking belt the beans are subjected to careful inspection and defective beans and undesirable items are removed. The finally approved dry, or substantially dry, beans then pass to a filler 14 where a carefully measured quantity of the beans is deposited in each can. The cans also receive, either just before or just after the filler station (as indicated at 15), or at the filler station if desired, the desired quota of syrup and condiments and a carefully measured quantity of water, which quantity of water will be enough to supply the beans with absorbable and unabsorbable moisture. The cans are then passed through a closer 16, of common type, and hermetically sealed.

The charged and sealed cans may be then carried through either one of two courses:—

(a) The cans are then crated on their sides instead of on end (for a purpose which will appear) and placed in a retort 18 where they are held at substantially atmospheric pressure at approximately 212° F. for a period of forty-five to ninety minutes, depending upon the absorption rate of the beans without agitation until the beans have become thoroughly impregnated with moisture.

The cans, lying on their sides, are now subjected to a quiescent further and higher heating, under an external pressure to counterbalance the generated pressure due to the higher heating, until the beans have attained the usual "processing" temperature maintained for the usual time (approximately 240° F. for about ninety minutes), whereupon the temperature is reduced during simultaneous maintenance of external pressure, as by the introduction of cooling water under pressure, in the usual manner, to prevent explosion of the cans, until the internal pressure generated by the applied heat has been reduced by temperature reduction to approximately 100° to 110° F. Cans are then removed from the crates at 18 and then agitated at station 20 in order to thoroughly distribute the unabsorbed liquor throughout the beans so that, when cooled and "set" said liquor will serve to maintain the beans well distributed in the can and thus avoid matting by settlement.

(b) The cans may be passed in a continuous series, but on their sides and without substantial agitation of their contents, from the closer 16 to and through a continuous cooker 21 where they are maintained approximately forty-five to ninety minutes at approximately 212° F. at substantially atmospheric pressure, passing thence to crates 22 where they are placed on their sides and thence to a regular pressure-processing retort 23 where they are subjected, while quiescent, to the usual "baking" temperature and simultaneous external pressure for the requisite cooking time, in accordance with well-established practice. The cans are then cooled in the usual way under external pressure until danger of explosion has been eliminated, whereupon they are removed and uncrated at 19' and passed thence through the agitator 20.

I have found that when beans have been processed through the processing retorts, as above-described, there is a very substantial tendency toward agglomeration if they are allowed to stand and cool without agitation during the final cooling period, but if the still warm cans are subjected to an agitation of a character to keep the individual beans separated, the tendency to agglomeration is avoided.

I have found that the desired agitation can be produced by causing the cans to roll downwardly through a vertical zigzag path with intermediate jarring due to short quickly checked drops.

Such an agitation may be readily obtained by causing the cans to pass through a vertical zigzag track such as I have indicated at 20.

All beans treated in the manner described are found in the can to be properly and acceptably individualized and with a flavor very much finer than attainable by previously known methods of treatment. This is undoubtedly due to the fact that, because of the total elimination of the preliminary parboiling step, which has heretofore been considered necessary, there is no loss of solubles and volatiles necessarily contained within the raw bean.

As a result of the retention of all solubles and volatiles, there is an increase in packaged weight per unit of raw beans, and I have found that by the practice of the above-described method I am able to obtain a considerably larger weight of marketable cooked bean per unit of raw bean than has heretofore been attainable.

It is important that, after the beans have materially softened, the cans be not materially agitated and that they be resting on their sides, in order that agglomeration of their contents be held to within a very small and unnoticeable percentage of the total contents.

Commercial cans, commonly used for packaging beans, have an axial dimension considerably greater than the diameter and the beans, during their treatment within the cans, swell and, as a result of the final "processing" become very soft.

If, during the swelling and softening periods, the cans be resting on end, the beans, especially in the lower regions of the cans, become so firmly packed and wedged in the cans that many of them are bursted and, of course, agitation during this period aggravates the difficulty. If, however, the cans be resting quietly on their sides, during the swelling and softening periods, the can wall, diverging outwardly and upwardly as it does from the line of rest to the medial horizontal plane, permits the beans to yield and adjust themselves in the cans without rupture of their softened skins. If the cans are rolled during this period, adjustment would be facilitated but the unavoidable friction would tend to rupture the beans. Substantial rolling, or other substantial agitation of the beans is, therefore, to be avoided during the swelling and softening periods.

As the beans are being "processed" the accompanying sauce thickens and, if the fully "processed" product is allowed to stand quiescent for any considerable period at normal atmospheric temperature, the beans and sauce tend to more or less agglomerate.

I have discovered that if, after beans have been heat-treated as described above, and before being carried to storage, and preferably shortly before their temperature has been reduced to atmospheric temperature, they be gently jarred and agitated the tendency to agglomerate is eliminated. I am not at all sure of the cause of this reaction but I have demonstrated the fact that, if, after the above-described heat treatment, and after sufficient cooling to prevent setting and before storage, the cans be agitated as described, the beans remain unruptured and the sauce is evenly coated over all of the beans and that thereafter the cans may remain in storage for long periods of time yet, when they reach the ultimate consumer, the contents will pour readily from the opened cans and the beans will be unruptured though thoroughly "baked".

What I have said above applies with equal force to other comestibles of the dry seed type and I have used the term "bean" as inclusive of such seeds.

The phrase "cylindrical cans" is used to designate a container having substantially flat end walls and an axially-extending connecting wall which, when the can is placed so as to rest on that wall, affords for the lower-region contents, upwardly divergent portions.

I claim as my invention:

1. The method of packaging and heat-treating comestibles of the dry-seed type, which includes the step of hermetically sealing measured quantities of dry seed and water in a cylindrical can; the step of subjecting the charged sealed can while quiescent and on its side to a super-atmospheric temperature without development of bulging internal pressure for a period sufficient to cause substantial water-penetration of the seed; the step of subsequent higher heat treatment while quiescent and on its side developing substantial internal pressure to accomplish final cooking; the step of cooling to substantially eliminate internal pressure; and the final step of agitation before final storage to prevent agglomeration.

2. The method of packaging and heat-treating comestibles of the dry-seed type, which includes the step of hermetically sealing measured quantities of dry seed and water in a cylindrical can; the step of subjecting the charged sealed can while quiescent and on its side to a super-atmospheric temperature without development of bulging internal pressure for a period sufficient to cause substantial water-penetration of the seed; the step of subsequent higher heat treatment while quiescent and on its side developing substantial internal pressure to accomplish final cooking; the step of cooling to substantially eliminate internal pressure; and the final step of agitation during further cooling to prevent agglomeration.

3. The method of packaging and heat-treating comestibles of vegetable origin which includes the step of hermetically sealing measured quantities of raw comestible and water in a cylindrical can; the step of subjecting the charged sealed can while quiescent and on its side to a super-atmospheric temperature without development of bulging internal pressure for a period sufficient to cause substantial water-penetration of the seed; the step of subsequent higher heat treatment while quiescent and on its side developing substantial internal pressure to accomplish final cooking; the step of cooling to substantially eliminate internal pressure; and the final step of agitation before final storage to prevent agglomeration.

4. The method of packaging and heat-treating comestibles of vegetable origin which includes the step of hermetically sealing measured quantities of raw comestible and water in a cylindrical can; the step of subjecting the charged sealed can while quiescent and on its side to a super-atmospheric temperature without development of bulging internal pressure for a period sufficient to cause substantial water-penetration of the seed; the step of subsequent higher heat treatment while quiescent and on its side developing substantial internal pressure to accomplish final cooling; the step of cooling to substantially eliminate internal pressure; and the final step of agitation during further cooling to prevent agglomeration.

5. The method of packaging and heat-treating dry seeds, such as beans, which includes the step of hermetically sealing predetermined quantities of such seeds raw, condiments and water in a cylindrical can; the step of subjecting the charged sealed can while quiescent and on its side to a scalding temperature, without development of bulging internal pressure, for more than thirty minutes but less than one hundred twenty minutes; the step of subsequent higher heat treatment while the cans are quiescent and on their sides to develop substantial internal pressure while simultaneously subjecting the can to external pressure to prevent straining bulging for a period sufficient to cook the seeds; the subsequent cooling of said can while subjected to external pressure until substantial internal pressure is eliminated.

6. The method of packaging and heat-treating dry seeds, such as beans, which includes the step of hermetically sealing predetermined quantities of such seeds raw, condiments and water in a cylindrical can; the step of subjecting the charged sealed can while quiescent and on its side to a scalding temperature, without development of bulging internal pressure, for more than thirty minutes but less than one hundred twenty minutes; the step of subsequent higher heat treatment while the cans are quiescent and on their sides to develop substantial internal pressure while simultaneously subjecting the can to external pressure to prevent straining bulging for a period sufficient to cook the seeds; the subsequent cooling of said can while subjected to external pressure until substantial internal pressure is eliminated; and the final step of agitation before storage to prevent agglomeration.

7. The method of packaging and heat-treating dry seeds, such as beans, which includes the step of hermetically sealing predetermined quantities of such seeds raw, condiments and water in a cylindrical can; the step of subjecting the charged sealed can while quiescent and on its side to a scalding temperature, without development of bulging internal pressure, for more than thirty minutes but less than one hundred twenty minutes; the step of subsequent higher heat treatment while the cans are quiescent and on their sides to develop substantial internal pressure while simultaneously subjecting the can to external pressure to prevent straining bulging for a period sufficient to cook the seeds; the subsequent cooling of said can while subjected to external pressure until substantial internal pressure is eliminated; and the final step of agitation during further cooling to prevent agglomeration.

EDWARD C. EBERTS.

CERTIFICATE OF CORRECTION.

Patent No. 2,073,339.　　　　　　　　　　　　　　　　March 9, 1937.

EDWARD C. EBERTS.

It is hereby certified that error appears in the printed specification of the above numbered patent requiring correction as follows: Page 3, first column, line 40, claim 4, for the word "cooling" read cooking; and that the said Letters Patent should be read with this correction therein that the same may conform to the record of the case in the Patent Office.

Signed and sealed this 6th day of April, A. D. 1937.

(Seal)

Henry Van Arsdale
Acting Commissioner of Patents.

sealed can while quiescent and on its side to a super-atmospheric temperature without development of bulging internal pressure for a period sufficient to cause substantial water-penetration of the seed; the step of subsequent higher heat treatment while quiescent and on its side developing substantial internal pressure to accomplish final cooking; the step of cooling to substantially eliminate internal pressure; and the final step of agitation during further cooling to prevent agglomeration.

3. The method of packaging and heat-treating comestibles of vegetable origin which includes the step of hermetically sealing measured quantities of raw comestible and water in a cylindrical can; the step of subjecting the charged sealed can while quiescent and on its side to a super-atmospheric temperature without development of bulging internal pressure for a period sufficient to cause substantial water-penetration of the seed; the step of subsequent higher heat treatment while quiescent and on its side developing substantial internal pressure to accomplish final cooking; the step of cooling to substantially eliminate internal pressure; and the final step of agitation before final storage to prevent agglomeration.

4. The method of packaging and heat-treating comestibles of vegetable origin which includes the step of hermetically sealing measured quantities of raw comestible and water in a cylindrical can; the step of subjecting the charged sealed can while quiescent and on its side to a super-atmospheric temperature without development of bulging internal pressure for a period sufficient to cause substantial water-penetration of the seed; the step of subsequent higher heat treatment while quiescent and on its side developing substantial internal pressure to accomplish final cooling; the step of cooling to substantially eliminate internal pressure; and the final step of agitation during further cooling to prevent agglomeration.

5. The method of packaging and heat-treating dry seeds, such as beans, which includes the step of hermetically sealing predetermined quantities of such seeds raw, condiments and water in a cylindrical can; the step of subjecting the charged sealed can while quiescent and on its side to a scalding temperature, without development of bulging internal pressure, for more than thirty minutes but less than one hundred twenty minutes; the step of subsequent higher heat treatment while the cans are quiescent and on their sides to develop substantial internal pressure while simultaneously subjecting the can to external pressure to prevent straining bulging for a period sufficient to cook the seeds; the subsequent cooling of said can while subjected to external pressure until substantial internal pressure is eliminated.

6. The method of packaging and heat-treating dry seeds, such as beans, which includes the step of hermetically sealing predetermined quantities of such seeds raw, condiments and water in a cylindrical can; the step of subjecting the charged sealed can while quiescent and on its side to a scalding temperature, without development of bulging internal pressure, for more than thirty minutes but less than one hundred twenty minutes; the step of subsequent higher heat treatment while the cans are quiescent and on their sides to develop substantial internal pressure while simultaneously subjecting the can to external pressure to prevent straining bulging for a period sufficient to cook the seeds; the subsequent cooling of said can while subjected to external pressure until substantial internal pressure is eliminated; and the final step of agitation before storage to prevent agglomeration.

7. The method of packaging and heat-treating dry seeds, such as beans, which includes the step of hermetically sealing predetermined quantities of such seeds raw, condiments and water in a cylindrical can; the step of subjecting the charged sealed can while quiescent and on its side to a scalding temperature, without development of bulging internal pressure, for more than thirty minutes but less than one hundred twenty minutes; the step of subsequent higher heat treatment while the cans are quiescent and on their sides to develop substantial internal pressure while simultaneously subjecting the can to external pressure to prevent straining bulging for a period sufficient to cook the seeds; the subsequent cooling of said can while subjected to external pressure until substantial internal pressure is eliminated; and the final step of agitation during further cooling to prevent agglomeration.

EDWARD C. EBERTS.

CERTIFICATE OF CORRECTION.

Patent No. 2,073,339.

March 9, 1937.

EDWARD C. EBERTS.

It is hereby certified that error appears in the printed specification of the above numbered patent requiring correction as follows: Page 3, first column, line 40, claim 4, for the word "cooling" read cooking; and that the said Letters Patent should be read with this correction therein that the same may conform to the record of the case in the Patent Office.

Signed and sealed this 6th day of April, A. D. 1937.

(Seal)

Henry Van Arsdale
Acting Commissioner of Patents.

CERTIFICATE OF CORRECTION.

Patent No. 2,073,339.  March 9, 1937.

EDWARD C. EBERTS.

It is hereby certified that error appears in the printed specification of the above numbered patent requiring correction as follows: Page 3, first column, line 40, claim 4, for the word "cooling" read cooking; and that the said Letters Patent should be read with this correction therein that the same may conform to the record of the case in the Patent Office.

Signed and sealed this 6th day of April, A. D. 1937.

(Seal)

Henry Van Arsdale
Acting Commissioner of Patents.